United States Patent [19]

Tsuzuki et al.

[11] Patent Number: 5,533,930
[45] Date of Patent: Jul. 9, 1996

[54] APPARATUS FOR PRODUCING A SILICON NITRIDE SINTERED BODY

[75] Inventors: Yasushi Tsuzuki; Shin-ichi Yamagata; Akira Yamakawa, all of Hyogo, Japan

[73] Assignee: Sumitomo Electric Industries, Ltd., Osaka, Japan

[21] Appl. No.: 219,719

[22] Filed: Mar. 29, 1994

Related U.S. Application Data

[62] Division of Ser. No. 78,084, Jun. 18, 1993.

[30] Foreign Application Priority Data

Jun. 18, 1992 [JP] Japan .................................. 4-184416
Jun. 18, 1992 [JP] Japan .................................. 4-184417

[51] Int. Cl.$^6$ ..................................................... F27B 7/28
[52] U.S. Cl. ........................ 432/120; 432/156; 432/206
[58] Field of Search ................................. 432/120, 206, 432/254.1, 254.2, 156

[56] References Cited

U.S. PATENT DOCUMENTS

| | | | |
|---|---|---|---|
| 2,789,808 | 4/1957 | Blackman | 432/206 |
| 4,747,984 | 5/1988 | Soma et al. | 264/65 |
| 4,850,860 | 7/1989 | Albonetti | 432/206 |
| 4,913,652 | 4/1990 | Tanji et al. | 432/156 |
| 5,045,513 | 9/1991 | Mizuno et al. | 501/98 |
| 5,173,458 | 12/1992 | Nishioka et al. | 264/65 |
| 5,188,781 | 2/1993 | Peuckert | 264/65 |
| 5,207,573 | 5/1993 | Miyagi et al. | 432/206 |
| 5,225,127 | 7/1993 | Nishioka et al. | 264/65 |
| 5,234,642 | 8/1993 | Nishioka et al. | 264/65 |

FOREIGN PATENT DOCUMENTS

| | | |
|---|---|---|
| 0079678 | 5/1983 | European Pat. Off. . |
| 0081195 | 6/1983 | European Pat. Off. . |
| 0225087 | 6/1987 | European Pat. Off. . |
| 3825955 | 2/1989 | Germany . |

*Primary Examiner*—Erick R. Solis
*Attorney, Agent, or Firm*—Cushman Darby & Cushman

[57] ABSTRACT

Provided is an apparatus for producing a silicon nitride sintering body made of a furnace including a heater source. The furnace includes a furnace core chamber defined by at least one partition inside the furnace to prevent an atmosphere containing more than about 30 ppm of carbon monoxide from contacting said silicon nitride sintered body. At least an inner surface of the partition is made of a carbon-free heat-proof material which prevents formation of carbon monoxide gas in an atmosphere in contact with the silicon nitride sintered body during sintering. The furnace also includes a gas supply pipe for supplying an $N_2$ gas or an inactive gas including an $N_2$ gas into the furnace core. Also provided is a sintering case made of a vessel defining a sintering atmosphere. The vessel has an opening for loading an object to be sintered into the vessel. At least an inner surface of the vessel is made of a carbon-free heat proof material which prevents the formation of carbon monoxide gas in the sintering atmosphere. The vessel also includes a lid for covering the opening. At least an inner surface of the lid is made of a carbon-free heat proof material which prevents the formation of carbon monoxide gas in the sintering atmosphere.

9 Claims, 2 Drawing Sheets

APPARATUS FOR PRODUCING A SILICON NITRIDE SINTERED BODY

This is a division of application Ser. No. 08/078,084, filed Jun. 18, 1993.

BACKGROUND OF THE INVENTION

1. Field of the Invention

The present invention relates to a process of producing a silicon nitride ($Si_3N_4$) sintered body, and an apparatus for producing the same.

2. Description of Related Art

In conventional production of a silicon nitride sintered body, a sintering aid such as $Y_2O_3$, $Al_2O_3$, MgO, or the like, is mixed with silicon nitride powder and the mixture is formed into a shaped body. The shaped body is then sintered at a high temperature, about 1800° C., in an atmosphere of a N2 gas or an inactive gas including the N2 gas to produce a shaped silicon nitride sintered body.

A conventional furnace for sintering a shaped body is shown in FIG. 1 (PRIOR ART). The conventional furnace has an adiabatic material 4, a heating source such as a heater 5, and a jig 2 for supporting the shaped body. Conventional furnace materials typically comprise carbon-containing materials.

A conventional process in which the pressure of the $N_2$ gas atmosphere is increased to a range of from 1.5 to 50 kg/cm² to reduce thermal decomposition of silicon nitride at a high temperature, is disclosed in Japanese Patent Post-examination Publication No. Sho-58-49509.

A process to improve the surface characteristics of a shaped silicon nitride sintered body by preventing evaporation or nitration of $SiO_2$ which is contained in the surface of the silicon nitride powder is disclosed in Japanese Patent Post-examination Publication No. Hei-3-1270. JP '1270 discloses a process in which a $CO_2$ gas or a $CO_2$ gas and a CO gas are mixed with an $N_2$ gas atmosphere, and an $O_2$ is generated by decomposition of the $CO_2$ gas to increase the oxygen partial pressure to thereby reduce evaporation or nitration of $SiO_2$ contained in the surface of the silicon nitride powder.

As another process of sintering a shaped silicon nitride body wherein it is buried in silicon nitride powder or powder having the same composition as the shaped body has been tried. However, the sintering atmosphere still comes in contact with the shaped body causing the same problems described above.

In conventional processes, the surface of the shaped silicon nitride body is degenerated during sintering in the furnace by contact with the sintering gas atmosphere. As a result, the mechanical properties of the sintered body are degraded. Therefore, the degenerated layer must be removed by grinding or the like. The degree of degeneration or the thickness of the degenerated layer varies depending on the sintering batches. Further, the sintered body is difficult to be ground, and when the degenerated layer becomes thicker, its thickness varies more largely among the respective sintered bodies, so that portions to be processed must be made larger. Accordingly, the cost of producing a sintered shaped body is significantly increased and the productivity is significantly decreased.

Conventional furnaces have many problems, including uneven temperature distribution and uneven regulation of the atmospheric gas so that the size of the furnace is limited and the quantity of shaped bodies to be sintered therein is limited, which are large obstacles against improving productivity.

SUMMARY OF THE INVENTION

An object of the present invention is to provide a satisfactory process to be capable of solving the above problems, for producing a shaped silicon nitride sintered body having a high density and a superior strength wherein the degeneration of its surface during sintering is reduced.

Another object of the present invention is to provide an economical furnace for sintering a shaped silicon nitride body which solves the problems associated with conventional processes.

A first embodiment is a process for producing a shaped silicon nitride sintered body comprising the steps of shaping a mixture of silicon nitride powder and a sintering aid to prepare a shaped body, and sintering the shaped body in an atmosphere of an $N_2$ gas or an inactive gas including an $N_2$ gas, characterized in that a CO (carbon monoxide) gas concentration in the atmosphere contacting the shaped body during sintering is not higher than about 30 ppm.

A second embodiment comprises a process for producing a silicon nitride sinter comprising the steps of shaping a mixture of silicon nitride powder and a sintering aid to prepare a shaped body, sintering the shaped body in a sintering case at least the inner surface of which comprises carbon-free heat-proof materials, when required, supporting the shaped body by a jig comprising carbon-free heat-proof materials, replacing the atmosphere in the sintering case with an $N_2$ gas or an inactive gas including an $N_2$ gas, and sintering the shaped body in the sintering case under conditions such that the atmosphere in a furnace cannot come in contact with the shaped body.

A third embodiment is an apparatus for sintering the shaped body comprising a furnace core chamber defined by providing partitions inside the furnace and a heating source, and an atmospheric gas supplying pipe for supplying an $N_2$ gas or an inactive gas including an $N_2$ gas into the furnace core chamber, wherein at least the inner surface of the furnace core chamber comprises carbon-free heat-proof materials. The shaped body is disposed in the furnace core chamber directly and, when required, the shaped body is supported by a jig comprising carbon-free heat-proof materials.

DETAILED DESCRIPTION OF THE PREFERRED EMBODIMENTS

Figure 1:
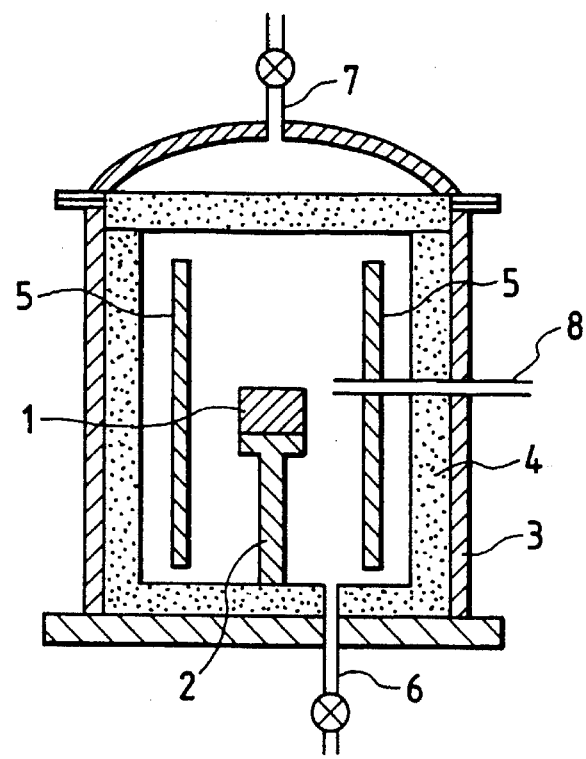
FIG. 1 (PRIOR ART) is a sectional view illustrating a conventional furnace for producing a conventional silicon nitride sintered body.

The inventors analyzed conventional sintering processes and furnaces including, for example, the components of the sintering gas atmosphere during sintering, the materials comprising the furnace, the loss in weight of a sinter, and therefrom, the inventors surprisingly discovered that CO in the sintering gas atmosphere has a strong relationship to the formation of the degenerated layer on the surface of a shaped silicon nitride sintered body.

Because graphite or carbon fibers are typically used as conventional furnace materials, moisture remaining in the furnace by absorption or oxygen in the air reacts with these carbon-containing materials at a high temperature to thereby produce CO. This CO reduces and gasifies sintering assistant agents such as $Y_2O_3$, $Al_2O_3$ or the like, and also $SiO_2$ which is contained in the surface of the silicon nitride powder. As a result, the quantity and composition of the sintering assistant agent and $SiO_2$ are changed in the surface area of a shaped body so that a degenerated layer is thereby formed on the surface of a shaped silicon nitride sintered body.

For example, $SiO_2$ contained in the surface of the $Si_3N_4$ powder reacts with CO in the sintering atmosphere by the reaction shown in the following Formula 1, and is gasified as SiO, which is reduced by carbon-containing materials in the furnace by the reaction of Formula 2 to thereby produce CO again:

$$SiO_2 + CO \rightarrow SiO\uparrow + CO_2\uparrow \qquad \text{Formula 1}$$

$$SiO + 2C \rightarrow SiC + CO\uparrow \qquad \text{Formula 2}$$

$CO_2$ produced in the above Formula 1 is also reduced by carbon-containing materials to thereby produce CO again as shown in the following Formula 3. In the case of sintering a shaped body in direct contact with a jig comprising carbon-containing materials, $SiO_2$ is reduced by carbon directly to thereby produce SiO and CO as shown in the following Formula 4:

$$CO_2 + C \rightarrow 2CO\uparrow \qquad \text{Formula 3}$$

$$SiO_2 + C \rightarrow SiO\uparrow + CO\uparrow \qquad \text{Formula 4}$$

If the sintering aid or $SiO_2$ is evaporated during sintering, the quantity of CO in the atmosphere is significantly increased by the chain reaction shown above in Formulae 1–4 so that the interaction of CO and the sintering aid or $SiO_2$ is likely to be significant and advance well inside the shaped body.

The concentration of CO produced in the furnace is affected by, for example, the quantity of moisture or residual air in the furnace, the flow rate of the atmospheric gas, and the quantity of a formed body, so that the thickness or degree of the degenerated layer on the surface varies in accordance with each sintered lot.

In the first embodiment, the concentration of CO in the atmosphere contacting the shaped body during sintering is reduced in order to cut off the chain reactions shown in the above Formulae 1 to 4. If the concentration of CO in an $N_2$ gas or an inactive gas including an $N_2$ gas used as a sintering atmosphere is not higher than about 30 ppm, the evaporation of $SiO_2$ or the sintering aid from the shaped body is prevented which significantly reduces the production of a degenerated layer in the surface of an obtained sinter.

If the concentration of CO in the sintering gas atmosphere is greater than about 30 ppm, the degeneration of the sintered surface advances rapidly and the thickness of the degenerated layer is significantly increased. The higher the concentration of CO, the more the sintering aid or $SiO_2$ evaporates from the shaped silicon nitride body during sintering. At high CO concentrations, the sintering aid evaporates from the inside as well as from the surface of the shaped body during sintering so that a composition of the liquid phase consisting of the sintering aids formed thereof is changed which significantly deteriorates the properties of sintered body and makes it impossible to obtain a sintered body with adequate strength.

Further, according to the first embodiment, there is no evaporation of $SiO_2$ or the sintering aid so that it is possible to obtain sintered bodies at a low temperature in comparison with that of conventional processes. Typically, a high sintering temperature in a range of from about 1,700 to about 1,900° C. is conventional in order to compensate for the lower sinterability described above.

In the first embodiment, however, the sintering temperature can be within a range of from about 1,300° to about 1,800° C. and preferably within a range of from about 1,400° to 1,750° C. The adequate sintering temperature should be set to obtain the relative density within above temperature range is not lower than about 96%.

In the sintering temperature is lower than about 1,300° C., no liquid phase is formed by the sintering aid and sintering will not occur.

In the first embodiment, sintering is performed at a temperature not higher than about the temperature where thermal decomposition of silicon nitride starts, which is typically about 1,800° C. Therefore, the pressure of the $N_2$ gas or the sintering atmosphere including the $N_2$ gas can be set at about atmospheric pressure, such as for example, within a region of from about 1.0 to about 1.1 atmospheric pressure. Therefore, according to this invention, sintering can be performed under atmospheric pressure of $N_2$ gas. Thus an equipment or operation for pressurizing the atmosphere is not necessary.

If the shaped silicon nitride sintered body obtained in the first embodiment is secondarily sintered at a temperature with in a range of from about 1,300° to about 1,800° C. in an $N_2$ gas atmosphere not lower than about 10 atmospheric pressure, it is possible to make the sintered body dense and to increase the strength thereof. If the temperature is lower than about 1,300° C. or the $N_2$ gas atmosphere is lower than about 10 atmospheric pressure, the effect of making the sintered body dense cannot be obtained. If the temperature is greater than about 1,800° C., uneven growth of crystal grains occurs while the sintered body is made dense, so that the minute structure is changed, which is not preferable. It is not necessary to control the concentration of CO in the atmosphere during secondary sintering.

In the second embodiment, the production of a degenerated layer in the surface of an obtained sintered body is reduced by cutting off the contact between the sintering atmosphere including CO and the shaped body during sintering. To accomplish such, a sintering case surrounding the shaped body, and when necessary a jig for supporting the shaped body in the sintering case, can be used which comprise carbon-free heat-proof materials. Because there is no contact between a sintering atmosphere gas containing CO and the shaped body during sintering, $SiO_2$ and the sintering aid are not altered or evaporated from the shaped body. A shaped silicon nitride sintered body having extremely little degenerated layer on its surface is thereby obtained.

The sintering case used in the second embodiment is formed of materials being heat-proof at sintering temperatures and at least the inner surface of the sintering case comprises carbon-free heat-proof materials.

Any conventional carbon-free heat-proof material can be used. Preferred examples of carbon-free heat-proof materials include silicon carbide, silicon nitride and boron nitride.

Figure 3:
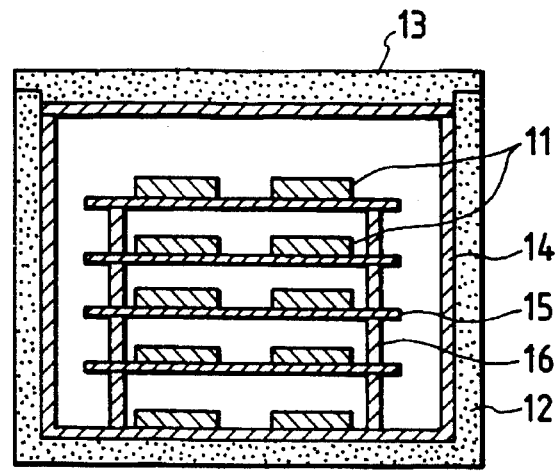
FIG. 3 is a sectional view illustrating a sintering case used in a process according to the present invention.

An example of the sintering case is shown in FIG. 3. The sintering case comprises a vessel 12 having an opening portion through which a formed body is inserted and a cap 13 for stopping up the opening portion so that atmospheric ventilation can be forced through the gap between the vessel and the cap, but atmospheres inside and outside of the sintering case are not mixed with each other if there is not a large difference of pressure between the inside and the outside the sintering case. The sintering case further includes an inside panel 14 of carbon free material such as boron nitride, which is 3 mm thick and is disposed on the inside of the vessel.

One or plurality of shaped bodies 11 are set in the sintering case directly or by using the support of a jig 15 and 16 formed of carbon-free heat-proof materials. After placing the shaped bodies in the sintering case, or at the same time, the atmosphere in the sintering case is replaced by an $N_2$ gas or an inactive gas including an $N_2$ gas. The replacement of the atmosphere inside the sintering case can be performed, for example, through the gap between the cap and the sintering case after the cap is closed, or the cap may be closed after replacing the atmosphere in the sintering case. The shaped body in the sintering case can be put in a conventional furnace, and sintered.

The second embodiment has many advantages in view of the cost and productivity because equipment or procedures for providing pressure to the furnace are not necessary and it is possible to use an open type continuously sintering furnace such as a tray-pusher type, belt-conveyor type, roller-hearth type, or the like, which is superior in evenness of heating, in sintering rate, and in sintering efficiency. Further, according to the second embodiment, even if the concentration of CO is larger than 30 ppm contrary to the first embodiment, since the shaped body is protected by the case, the same effect as that of the first embodiment can be obtained. Further, in this embodiment, the carbon-free heat-proof material is only disposed inside the sintering case, which is easily performed. Also, many variations in practice are conceived so that the embodiment is practical.

The cap of the sintering case is preferably sealed so that gas cannot flow into the sintering case from the furnace. However, even without sealing the sintering case the atmosphere in the furnace does not flow into the sintering case if the pressure in the sintering case is almost the same as or higher than the pressure in the furnace, so that the shaped body does not contact the atmosphere in the furnace.

Preferably, the furnace atmospheric gas supplied into the furnace is the same as the atmospheric gas charged into the sintering case, and the pressure in the sintering case is made higher than the pressure of the furnace atmosphere during sintering.

A shaped silicon nitride sintered body made according to the second embodiment can be subjected to a second sintering step as defined above in the first embodiment.

An apparatus according to the third embodiment, for producing a shaped silicon nitride sintering body, will be described. This apparatus is intended to realize the first embodiment. According to the first embodiment, if all furnace materials of this furnace are made of carbon-free heat-proof materials, a furnace core chamber as shown in FIG. 2 is not necessary.

A conventional furnace is shown in FIG. 1. The furnace materials such as an adiabatic material 4, a heater 5, and a jig 2 used for supporting a shaped body 1 are typically carbon-containing materials. The conventional furnace also includes an outer wall 3, a gas supplying pipe 6, an atmosphere exhaust pipe 7, and an atmosphere measuring hole 8.

Figure 2:
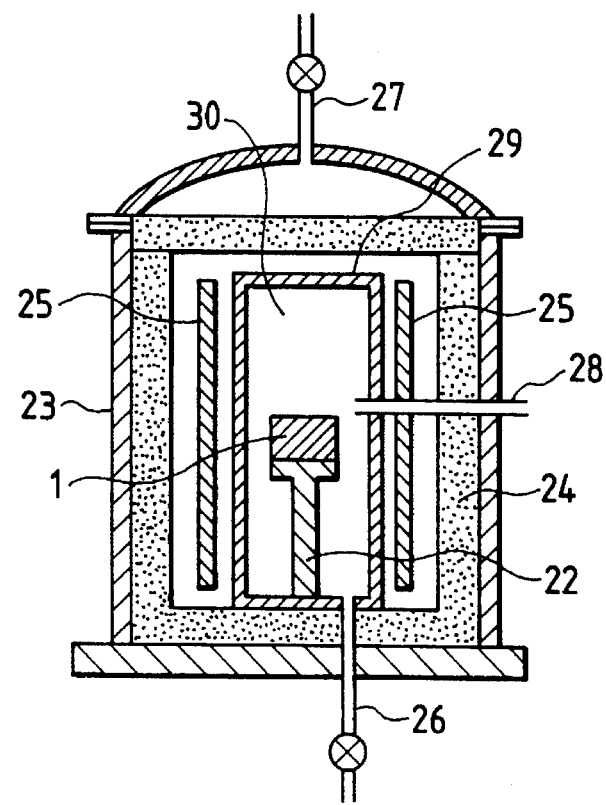
FIG. 2 is a sectional view illustration an example of a furnace for producing a silicon nitride sintered body according to the present invention.

A furnace according to the third embodiment is shown in FIG. 2. The furnace materials such as an adiabatic material 24 and a heater 25 comprise carbon-free heat-proof materials, or if they comprise carbon-containing materials, CO produced by the interaction of residual moisture or air and the carbon-containing materials is prevented from contacting the shaped body 1) during sintering, so that the concentration of CO in the atmosphere contacting the shaped body is not higher than about 30 ppm.

For example, as shown in FIG. 2, a partition 29 is disposed between a shaped body 1 to be sintered and furnace materials such as an adiabatic material 24 provided inside an outer wall 23 of a furnace, and between the shaped body 1 and a heating source such as a heater 25, and the whole of the partition 29 or only the side of the partition 29 facing to a furnace core chamber 30 comprises carbon-free heat-proof materials.

Any conventional carbon-free heat-proof material can be used. Preferred examples of the carbon-free heat-proof materials include silicon carbide, silicon nitride, boron nitride.

If a jig 22 is used for supporting the shaped body 1, the jig 22 also comprises carbon-free heat-proof materials.

In the furnace of FIG. 2, an $N_2$ gas or an inactive gas including an $N_2$ gas is led into the furnace core chamber 30 through an atmospheric gas supplying pipe 26. The atmospheric gas passes through gaps of the partitions 29, and is exhausted through an atmospheric gas exhaust pipe 27. Preferably, the pressure in the furnace core chamber 30 is set to be higher than the pressure in the furnace, so that a CO gas produced outside the furnace core chamber 30 by the interaction of carbon-containing materials and air or the like is prevented from intruding into the furnace core chamber 30.

The atmospheric gas can be sampled from a measuring hole 28 so that the concentration of CO in the atmosphere contacting the shaped body 1 in the furnace core chamber 30 can be analyzed and measured continuously.

In the case where the furnace core chamber 30 is not formed by the partition 29, all the furnace materials, such as the adiabatic material 24, the heater 25, and the jig 22 used for supporting a shaped body 1 comprise carbon-free heat-proof materials, so that the production of CO from carbon-containing heat-proof materials is prevented and the concentration of CO in the atmosphere contacting the shaped body is not higher than about 30 ppm.

For example, a high-alumina adiabatic material and a heater of SiC, tungsten or the like can be used, and in such a case, preferably, the sintering temperature is not higher than about 1,500° C. so that the durability and life of the heater in the sintering atmosphere is not reduced.

The invention will be further explained below by the non-limiting examples. Examples 1–3 represent embodiments 1 and 3. Examples 4–6 represent embodiment 2.

EXAMPLE 1

4.5 weight % $Y_2O_3$ powder of average grain size 0.8 μm, 2.5 weight % $Al_2O_3$ powder of average grain size 0.4 μm, 1.0 weight % AlN powder of average grain size 0.5 µm, and 1.0 weight % MgO powder of average grain size 0.5 µm were added as sintering aid to 91 weight % $Si_3N_4$ powder (α-phase crystallization rate 96%) of average grain size 0.4 µm wet-mixed for 100 hours in ethanol by means of a nylon ball mill, and dried to form a mixture powder. The obtained mixture powder was CIP-formed under 3,000 kg/cm² to produce shaped bodies 65 mm long and wide, and 6.2 mm thick.

Using two kinds of furnaces as shown in FIGS. 1 and 2, the thus prepared shaped bodies were sintered for 4 hours at 1,450° C. in 1.0 atmospheric pressure and then 2 hours at 1,580° C. using a jig comprising the materials shown in the following Table 1, while an $N_2$ gas of initial CO concentration shown in the following Table 1 was led in through an atmospheric gas supplying pipe. A graphite heater and a carbon-containing adiabatic material were used in each furnace, and SiC was used as the carbon-free heat-proof material in the partition 29 in the furnace of FIG. 2. The atmospheric gas in the furnace core chamber during sintering was continuously sampled using the atmospheric gas measuring hole 28 to measure the concentration of CO continuously, and the results are shown Table 1.

TABLE 1

| sample | furnace | jig material | initial CO conc. (ppm) | CO conc. (ppm) during burning minimum | maximum |
|---|---|---|---|---|---|
| a | FIG. 2 | BN | 0 | 1 or less | 2 |
| b | FIG. 2 | BN | 5 | 5 | 6 |
| c | FIG. 2 | BN | 10 | 10 | 14 |
| d | FIG. 2 | BN | 15 | 15 | 22 |
| e | FIG. 2 | BN | 20 | 20 | 30 |
| f* | FIG. 2 | BN | 40 | 40 | 76 |
| g* | FIG. 2 | BN | 100 | 100 | 260 |
| h* | FIG. 2 | C | 0 | 1 or less | 120 |
| i* | FIG. 1 | C | 0 | 73 | 180 |

The samples having the affix (*) in all of the Tables are comparative examples.

The relative densities of respective obtained sinters, the losses in weight after sintering, and the three-point bending strengths at room temperature were measured, the results of which are shown in Table 2.

The relative densities were obtained by dividing apparent densities obtained through Archimedes' principle by their theoretical densities.

The loss in weight during sintering was obtained by dividing the difference in weight between the sinters and the weight of the shaped bodies by the weight of the shaped bodies and then multiplying by 100%.

The three-point bending strengths were measured according to JIS R1601. In this measuring method, there were prepared samples in which only a surface to which a tensile stress was applied at the measurement, was not ground or ground to a prescribed depth. A surface to which a compressive stress was applied at the measurement, was ground in accordance with JIS R1601.

Table 2 shows the relative densities, the loss in weights and the three-point bending strengths which were measured without grinding the sintered surfaces to which the tensile stress was applied and when the sintered surfaces to which the tensile stress was applied were ground to depths of 0.1 mm, 0.3 mm, 0.5 mm and 1.0 mm using a diamond abrasive (#800).

TABLE 2

| sample | relative density of sintered body (%) | loss in weight (%) | 3-point bending strength (kg/mm²) | | | | |
|---|---|---|---|---|---|---|---|
| | | | not-ground sintered surface | ground surface (portions ground off) | | | |
| | | | | 0.1 mm | 0.3 mm | 0.5 mm | 1.0 mm |
| a | 98.2 | 0.15 | 85.4 | 105.2 | 108.0 | 104.2 | 105.0 |
| b | 98.2 | 0.15 | 85.5 | 103.6 | 103.0 | 106.7 | 105.1 |
| c | 97.8 | 0.18 | 79.3 | 101.3 | 102.5 | 99.8 | 101.0 |
| d | 97.9 | 0.20 | 79.8 | 101.2 | 99.5 | 100.4 | 102.9 |
| e | 97.4 | 0.25 | 78.7 | 97.9 | 100.0 | 98.5 | 100.3 |
| f* | 97.0 | 0.89 | 75.4 | 83.2 | 98.3 | 98.0 | 97.6 |
| g* | 94.5 | 2.37 | 49.8 | 53.0 | 62.4 | 75.5 | 83.9 |
| h* | 96.5 | 1.45 | 67.5 | 65.4 | 75.7 | 95.8 | 96.3 |
| i* | 95.5 | 2.00 | 53.2 | 56.8 | 67.8 | 89.8 | 95.4 |

Table 2 illustrates that the strengths of samples (a) to (e), in which the concentration of CO in the atmosphere during sintering was controlled to be not higher than about 30 ppm, were almost equal in strength between the surface and their insides when portions of 0.1 mm were ground off. Therefore, the degeneration of their surfaces was extremely light.

In contract, Table 2 illustrates that comparative samples (f) and (i), in which the concentration of CO was greater than about 30 ppm, had thick degenerated layers and the reduction of strength caused by degeneration reached well inside the sinters, particularly in the samples (q) and (i). Samples (q) and (i) also exhibited a large loss of weight during sintering.

The comparison of sample (a), which is a typical example of the present invention, with sample (i), made according to a conventional sintering process, clearly illustrates that the concentration of CO during sintering has a large effect on the surface of a sinter and reducing the concentration of CO to less than about 30 ppm during sintering results in a remarkable decrease in surface degeneration of the sinter and loss in weight during sintering.

EXAMPLE 2

The sinters of the samples (a) to (e) obtained in Example 1 were secondarily sintered for 2 hours at 1,650° C. in an $N_2$ gas atmosphere at a pressure of 100 atmospheric pressures, and respective sinters of samples (a') to (e') were obtained. The respective sinters were measured in the same manner as in Example 1, and their obtained relative densities and three-point bending strengths are shown in Table 3.

The results in the following Table 3 show that the strength of a sinter can be significantly improved by secondary sintering, and the degeneration of the surface caused by the secondary sintering is so small that it is possible to obtain the strength equal to that of the inside if only a portion of about 0.1 mm is ground off.

TABLE 3

| | relative density of sintered body (%) | 3-point bending strength (kg/mm²) | | | | |
|---|---|---|---|---|---|---|
| | | not-ground sintered surface | ground surface (portions ground off) | | | |
| sample | | | 0.1 mm | 0.3 mm | 0.5 mm | 1.0 mm |
| a' | 100 | 87.0 | 155.1 | 152.3 | 153.0 | 154.5 |
| b' | 100 | 85.5 | 154.0 | 153.4 | 151.6 | 153.8 |
| c' | 99.9 | 80.0 | 154.2 | 151.5 | 152.2 | 152.5 |
| d' | 99.9 | 79.3 | 152.8 | 152.0 | 153.9 | 153.0 |
| e' | 99.9 | 79.4 | 153.5 | 151.7 | 151.0 | 152.6 |

EXAMPLE 3

Formed bodies made up in the same manner as in Example 1 were sintered five times under the same conditions as those of the samples (a) and (i) in the above Table 1, so that two sets of five samples (a-1) to (a-5) and (i-1) to (i-5) respectively were obtained. The characteristics of samples (a-1) to (a-5) and (i-1) to (i-5) were measured in the same manner as in Example 1 together with the concentration of CO in the sintering atmosphere during sintering. The results are shown in Table 4.

TABLE 4

| sample | CO conc. (ppm) during sintering maximum | relative density of sinter (%) | loss in weight (%) | 3-point bending strength (kg/mm²) ground surface (portion ground off) | | |
|---|---|---|---|---|---|---|
| | | | | 0.1 mm | 0.5 mm | 1.0 mm |
| a-1 | 2 | 98.2 | 0.15 | 104.3 | 106.7 | 105.2 |
| a-2 | 2 | 98.3 | 0.14 | 105.0 | 104.9 | 103.0 |
| a-3 | 4 | 98.2 | 0.15 | 103.8 | 106.0 | 104.2 |
| a-4 | 3 | 98.1 | 0.16 | 105.6 | 103.3 | 108.9 |
| a-5 | 2 | 98.2 | 0.15 | 107.0 | 106.5 | 109.4 |
| i-1* | 165 | 95.9 | 1.78 | 60.2 | 90.5 | 94.3 |
| i-2* | 200 | 95.1 | 2.05 | 54.3 | 66.6 | 93.8 |
| i-3* | 79 | 97.1 | 0.87 | 82.7 | 97.0 | 96.4 |
| i-4* | 100 | 96.6 | 1.30 | 65.4 | 96.0 | 97.1 |
| i-5* | 138 | 96.0 | 1.59 | 63.5 | 94.9 | 95.1 |

From Table 4, the change in the concentration of CO in the sintering atmosphere was small in the examples according to the invention and sinters having stable qualities and high strength were obtained.

In contrast, the change in the concentration of CO in the sintering atmosphere was large in the comparative examples which were sintered in a conventional process using a conventional furnace as shown in FIG. 1, and sintered bodies having large degenerated layers were obtained.

According to the first and third embodiments, the concentration of CO in the sintering atmosphere contacting the shaped body during sintering is reduced so as to be not higher than about 30 ppm, to obtain a silicon nitride sinter having high density and superior strength.

Because a sinter made according to the first and third embodiments has an extremely small degenerated layer on the surface, the amount of degenerated layer to be ground off is significantly reduced. Furthermore, the sintering can be performed at a lower temperature and lower pressure than in conventional processes, which results in a large reduction in the cost and a large improvement in the strength of the sinter.

EXAMPLE 4

4.5 weight % $Y_2O_3$ powder of average grain size 0.8 μm, 2.5 weight % $Al_2O_3$ powder of average grain size 0.4 μm, 1.0 weight % AlN powder of average grain size 0.5 μm, and 1.0 weight % MgO powder of average grain size 0.5 μm were added as sintering assistance agents to 91 weight % $Si_3N_4$ powder (α-phase crystallization rate 96%) of average grain size 0.4 μm, wet-mixed for 100 hours in ethanol by means of a nylon ball mill, and dried into mixture powder. The obtained mixture powder was CIP-formed under 3,000 kg/cm² to produce shaped bodies 65 mm long and wide, and 6.2 mm thick.

Figure 4:
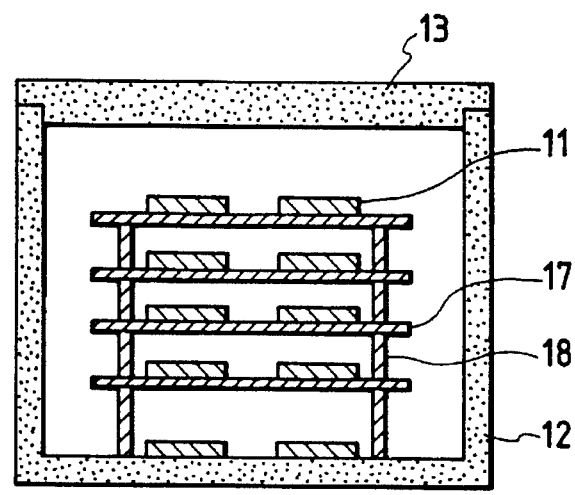
FIG. 4 (PRIOR ART) is a sectional view illustrating a conventional sintering case used for comparison in the examples.
Figure 5:
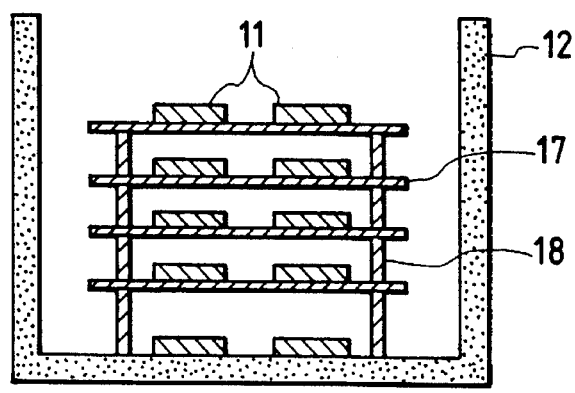
FIG. 5 (PRIOR ART) is a sectional view illustrating a conventional sintering case used for comparison in the examples.

Ten samples of the thus formed bodies were set in each of three kinds of sintering cases shown in FIGS. 3 to 5. Each of the sintering cases in FIGS. 3 and 4 comprise a box vessel 12 and a cap 13 which were made of carbon, and the sintering case in FIG. 5 comprised only a vessel 12 made of carbon. The sintering case in FIG. 3 had an inside panel 14 of boron nitride which was 3 mm thick.

In order to set shaped bodies 11 into the respective sintering cases, a plate-like jig 15 and a columnar jig 16 made of boron nitride was used in the sintering case in FIG. 3, and a plate-like jig 17 and a columnar jig 18 made of carbon were used in the sintering cases in FIGS. 4 and 5.

The respective sintering cases including the shaped bodies were put into a conventional batch furnace in which a graphite heater and a carbon-containing adiabatic material were used, and an $N_2$ gas was led into the furnace after the furnace and the sintering cases ere exhausted in vacuum, so that the atmospheres in the furnace and the sintering cases were replaced by the $N_2$ gas.

Sintering was performed for four hours at 1,450° C. and then for two hours at 1,580° C. in an $N_2$ gas atmosphere at 1.0 atmospheric pressure in the furnace and the sintering cases.

The relative densities of respective obtained sinters, the losses in weight after sintering, and the three-point bending strengths at room temperatures were measured as in Example 1, and the results are shown in Table 5.

TABLE 5

| sample | sintering case | CO conc. in furnace max. (ppm) | relative density (%) | loss in weight (%) | 3-point bending strength (kg/mm²) | | | |
|---|---|---|---|---|---|---|---|---|
| | | | | | not-ground surface | ground surface (portions ground off) | | |
| | | | | | | 0.1 mm | 0.3 mm | 1.0 mm |
| aa | FIG. 3 | 40 | 98.1 | 0.16 | 85.7 | 106.7 | 104.1 | 106.2 |
| bb* | FIG. 4 | 103 | 96.4 | 1.32 | 73.8 | 83.4 | 98.2 | 98.0 |
| cc* | FIG. 5 | 195 | 95.0 | 2.10 | 52.3 | 56.7 | 70.2 | 95.4 |

Table 5 illustrates that the sample (aa) made according to the second embodiment had the same strength as the inside of the sinter after grinding off about 0.1 mm, which means that any degeneration of the surface was very little. The sample (aa) was higher in density and superior in strength compared to the samples (bb) and (cc) which were made according to conventional methods.

The results in Table 5 confirm that the concentration of CO in the furnace significantly affects the thickness of the degeneration layer on the surface of a sinter, the strength of the sinter and the weight loss during sintering.

EXAMPLE 5

Five sintering cases shown in FIG. 3 and five sintering cases shown in FIG. 5 were prepared. Ten samples of shaped bodies made in the same manner as in Example 4 were set in the respective sintering cases, and a pair of the sintering case shown in FIG. 3 and the sintering case shown in FIG. 5 were put at the same time into the same furnace as that in Example 4. After replacing the atmosphere in the same manner as in Example 4, sintering under the same conditions as in Example 4 was carried out. Such sintering was repeated five time, so that two sets of five samples (aa-1) to (aa-5) using the sintering case of FIG. 3 and (cc-1) to (cc-5) using the sintering case of FIG. 5, were obtained.

The characteristics of the resulting sinters were measured in the same manner as in Example 4 and the concentration of CO inside the furnace was also measured for every lot. The results are shown in Table 6.

TABLE 6

| sample | CO conc. (ppm) max | relative Density (%) | | loss in weight (%) | | 3-point bending strength (kg/mm²) ground surface (portion ground off) | | |
|---|---|---|---|---|---|---|---|---|
| | | ave. | var. | ave. | var. | 0.1 mm | 0.3 mm | 1.0 mm |
| aa-1 | 180 | 98.2 | 0.42 | 0.15 | 0.06 | 106.8 | 104.7 | 105.6 |
| aa-2 | 125 | 98.1 | 0.43 | 0.15 | 0.05 | 105.9 | 103.0 | 109.4 |
| aa-3 | 83 | 98.1 | 0.40 | 0.16 | 0.04 | 106.0 | 108.9 | 107.0 |
| aa-4 | 205 | 98.2 | 0.50 | 0.17 | 0.05 | 103.3 | 104.9 | 106.5 |
| aa-5 | 96 | 98.1 | 0.52 | 0.14 | 0.04 | 104.2 | 105.0 | 103.0 |
| cc-1* | 180 | 95.5 | 1.23 | 1.97 | 0.37 | 58.5 | 68.9 | 94.6 |
| cc-2* | 125 | 96.4 | 1.06 | 1.49 | 0.12 | 65.8 | 76.1 | 95.1 |
| cc-3* | 83 | 97.0 | 1.10 | 0.91 | 0.08 | 80.4 | 97.0 | 98.7 |
| cc-4* | 205 | 95.0 | 1.53 | 2.10 | 0.31 | 57.6 | 65.8 | 93.3 |
| cc-5* | 96 | 96.7 | 1.07 | 1.22 | 0.15 | 78.2 | 96.5 | 97.2 |

The results of Table 6 show that because the difference among lots is so small in the examples made according to the second embodiment, the present invention is very precise and consistently produces sinters having a high density and high strength.

In contrast, the results in Table 6 show that in conventional processes, there occurs a considerably large and thick degenerated layer in the surfaces of all the sinters obtained from the comparative examples using the sintering case shown in FIG. 5.

EXAMPLE 6

Ten samples of shaped bodies made up in the same manner as in Example 4 were set in each of the three kinds of sintering cases shown in FIGS. 3 to 5 in the same manner as in Example 4. The respective sintering cases including the shaped bodies were sintered using a tray pusher type furnace in which a vacuum gas replacement room was provided at an entrance portion. The tray pusher type furnace was a conventional continuous furnace using a graphite heater and using carbon-containing materials as the furnace materials and the materials for the carrier tray.

First, the sintering cases containing shaped bodies therein were put other tray, and the atmosphere in each of the sintering cases was replaced by an $N_2$ gas after being exhausted in vacuum in the vacuum gas replacement room. The internal pressure of each of the sintering cases of FIGS. 3 and 4 was made to be 1.05 atmospheric pressure. Next, the respective sintering cases were carried into the furnace and the furnace atmosphere was $N_2$ gas at 1.0 atmospheric pressure and 200 mm $H_2O$. The sintering cases passed through an increasing temperature zone and the sintering cases were subjected to sintering while the sintering cases were conveyed at a constant speed so that the sintering cases were passed through, in six house, the uniform heat zones of 1,450° C. and 1,580° C. (zone length ratio 1,450° C.:1,580° C.=2:1). The concentration of CO in the furnace atmosphere before the sintering cases were put into the furnace was 120 ppm.

Table 7 shows the results of measuring, as in Example 1, of the relative density, the loss in weight after sintering, and three-point bending strengths at room temperature of each of the obtained sinters.

As is apparent from Table 7, similar characteristics as in the case of a batch furnace were also obtained in a continuous furnace according to the second embodiment (sample dd). The shaped sinters made according to the second embodiment exhibited superior strength and significantly reduce degeneration of the surface layer and loss in weight during sintering.

In contrast, the shaped sintered bodies in the comparative examples (samples ee and ff) exhibited low strength, large amounts of degeneration of the surface layer, a significant loss in weight during sintering and a low density.

TABLE 7

| sample | sintering case | relative density (%) ave. | var. | loss in weight (%) ave. | var. | 3-point bending strength (kg/mm²) ground surface (portion ground off) 0.1 mm | 0.3 mm | 1.0 mm |
|---|---|---|---|---|---|---|---|---|
| dd | FIG. 3 | 98.2 | 0.21 | 0.18 | 0.03 | 107.5 | 106.2 | 109.3 |
| ee* | FIG. 4 | 95.8 | 1.00 | 1.46 | 0.15 | 78.9 | 97.5 | 98.3 |
| ff* | FIG. 5 | 94.0 | 1.68 | 2.48 | 0.42 | 49.2 | 63.5 | 94.8 |

One lot composed of ten sintering cases of FIG. 3 respectively containing ten samples of the shaped bodies made up in the same manner as in Example 4 was sintered in a continuous furnace in the same manner, and such sintering was repeated so that five loss of sintered bodies were obtained. The relative density, and three-point bending strength at room temperature after a portion 0.1 mm was ground off, of each obtained sintered body was measured in the same manner as in Example 1, and the results of sintering lots are shown in Table 8.

The results in Table 8 illustrate that the process according to the second embodiment can produce shaped sintered bodies having significantly increased strength, significantly reduced degeneration of the surface layer during sintering with littly variance of the properties.

TABLE 8

| | sintering lot | 1 | 2 | 3 | 4 | 5 |
|---|---|---|---|---|---|---|
| relative density (%) | average | 98.2 | 98.2 | 98.1 | 98.2 | 98.2 |
| | variance | 0.30 | 0.28 | 0.31 | 0.30 | 0.29 |
| 3-point bending strength (0.1 mm ground off surface) | (kg/mm²) | 106.7 | 106.8 | 107.4 | 109.2 | 106.5 |

EXAMPLE 7

The sinters of the samples (aa) and (dd) according to the second embodiment, respectively obtained in Examples 4 and 6, were secondarily sintered for 1 hour at 1,650° C. in an $N_2$ gas atmosphere of 100 atmospheric pressure, and respective sinters of samples (aa') and (dd') were obtained. The characteristics of the respective sinters were measured in the same manner as in Example 1 to thereby obtain relative densities and three-point bending strengths after grinding off 0.1 mm from the surface. The results are shown in Table 9. The results in Table 9 illustrate that the strength of a sinter can be significantly improved by secondary sintering.

TABLE 9

| secondary sinter | | sample aa' | sample dd' |
|---|---|---|---|
| relative density | (%) | 100 | 100 |
| 3-point bending strength (0.1 mm ground off surface) | (kg/mm²) | 155.3 | 156.1 |

According to the second embodiment, the furnace atmosphere in which CO is produced in sintering is prevented from contacting the shaped body during sintering, and the atmosphere surrounding the shaped body is also prevented from contacting carbon-containing materials which can produce CO. Therefore, the process according to the second embodiment can produce shaped sintered bodies having significantly increased strength, significantly reduced degeneration of the surface layer during sintering and significantly reduced loss of weight during sintering with a very high precision.

The second embodiment results in a remarkable decrease in cost and increase in productivity compared to conventional processes because the shaped sintered body has an extremely small degenerated layer on its surface which results in a significantly reduced load required for grinding off the degenerated layer, and sintering can be performed at a lower temperature and lower pressure. The second embodiment also results in significantly increased cost savings because a conventional continuous furnace can be used.

While the invention has been described in detail and with reference to specific embodiments thereof, it is apparent to one of ordinary skill in the art that various changes and modifications can be made therein without departing from the spirit and scope thereof.

What is claimed is:

1. An apparatus for producing a silicon nitride sintered body comprising:

a furnace including a heater source;

a furnace core chamber defined by at least one partition inside said furnace to prevent an atmosphere containing more than about 30 ppm of carbon monoxide from contacting said silicon nitride sintered body, at least an inner surface of said partition comprising a carbon-free heat-proof material which prevents formation of carbon monoxide gas in an atmosphere in contact with said silicon nitride sintered body during sintering; and a gas supplying pipe for supplying an $N_2$ gas or an inactive gas including an $N_2$ gas into said furnace core.

2. An apparatus for producing a silicon nitride sintered body according to claim 1, further comprising a jig for supporting said silicon nitride sintered body, said jig comprising a carbon-free heat-proof material.

3. An apparatus for producing a silicon nitride sintered body according to claim 1, wherein said carbon-free heat proof material comprises at least one material selected from the group consisting of silicon carbide, silicon nitride and boron nitride.

4. A furnace for producing a silicon nitride sintered body comprising:

surface means for defining an atmosphere in contact with said silicon nitride sintered body, at least an inner surface of said surface means comprising a carbon-free heat-proof material which prevents formation of carbon monoxide gas in said atmosphere during sintering; and means for heating said atmosphere comprising a carbon-free heat-proof material which prevents formation of carbon monoxide gas in said atmosphere during sintering; and means for heating said atmosphere comprising a carbon-free heat-proof material which prevent formation of carbon monoxide gas in said atmosphere during sintering.

5. A furnace for producing a silicon nitride sinter according to claim 4, further comprising a jig for supporting said silicon nitride sintered body, said jig comprising a carbon-free heat-proof material.

6. A furnace for producing a silicon nitride sintered body according to claim 4, wherein said carbon-free heat proof material comprises at least one material selected from the group consisting of silicon carbide, silicon nitride and boron nitride.

7. A sintering case comprising:

a vessel defining a sintering atmosphere, said vessel having an opening for loading an object to be sintered into said vessel, at least an inner surface of said vessel comprising a carbon-free heat proof material which prevents the formation of carbon monoxide gas in said sintering atmosphere; and a lid for covering said opening, at least an inner surface of said lid comprising a carbon-free heat proof material which prevents the formation of carbon monoxide gas in said sintering atmosphere.

8. A sintering case according to claim 7, further comprising a jig for holding said object to be sintered in said vessel, said jig comprising a carbon-free heat proof material which prevents the formation of carbon monoxide gas in said sintering atmosphere.

9. A sintering case according to 7, wherein said carbon-free heat proof material comprises at least one material selected from the group consisting of silicon carbide, silicon nitride and boron nitride.

* * * * *